United States Patent [19]
Wilson

[11] 3,894,643
[45] July 15, 1975

[54] LOADING HOIST FOR BOATS

[76] Inventor: Archie P. Wilson, 1460 Alameda de Los Pulgas, San Mateo, Calif. 94402

[22] Filed: June 21, 1974

[21] Appl. No.: 481,482

[52] U.S. Cl. .............................. 214/450; 214/77 R
[51] Int. Cl. ................................................ B60r 9/00
[58] Field of Search ............. 214/450, 77, 92, 523; 224/42.1 H

[56] References Cited
UNITED STATES PATENTS

| | | | |
|---|---|---|---|
| 1,016,038 | 1/1912 | Samp | 214/92 |
| 2,486,316 | 10/1949 | Morse et al. | 214/450 |
| 2,572,778 | 10/1951 | Stephens | 214/77 R |
| 2,584,163 | 2/1952 | Squires | 214/77 R |
| 3,382,993 | 5/1968 | Bahrs | 214/450 |

*Primary Examiner*—Robert J. Spar
*Assistant Examiner*—Ross Weaver
*Attorney, Agent, or Firm*—Julian Caplan

[57] ABSTRACT

A hoist is attached to the rear of a vehicle (such as a pick-up truck) to lift a boat from the ground to the top of the vehicle. The hoist has two telescopic members which initially are flat on the ground in extended position. The lower ends of the telescopic members are braced to the vehicle (as by clamping to the rear bumper) and are pivoted to feet which rest on the ground and the lower telescopic members are cross-braced. The upper ends of the telescopic members are clamped to the gunwales near the stern of the boat. The boat rests upside down over the telescopic members with its prow near the rear of the vehicle. On the vehicle is a winch for a rope which passes over a pulley, then down to the ground, through a guide on the prow of the boat and thence to a point of attachment at the stern. As the winch is turned, the prow is lifted up to the pulley, the stern sliding on the ground toward the vehicle. For this purpose, wheels may be attached to the stern. As the stern moves toward the vehicle, the telescopic members contract. The prow slides forward on the top of the vehicle until it is horizontal. By a different arrangement of pulleys, the hoist and winch may be used to lower the boat to the ground.

5 Claims, 10 Drawing Figures

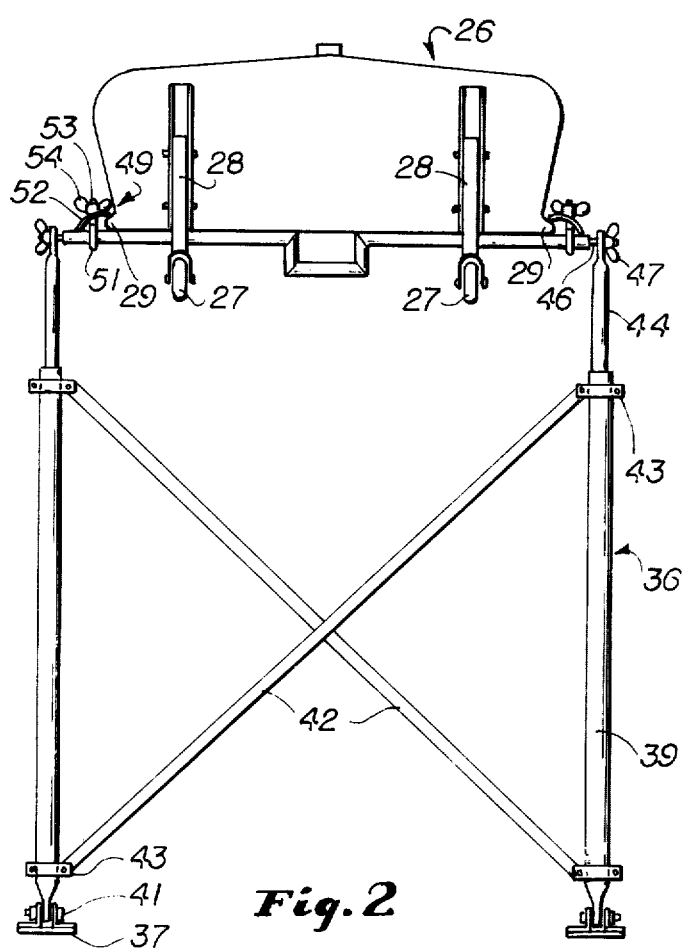
Fig. 2
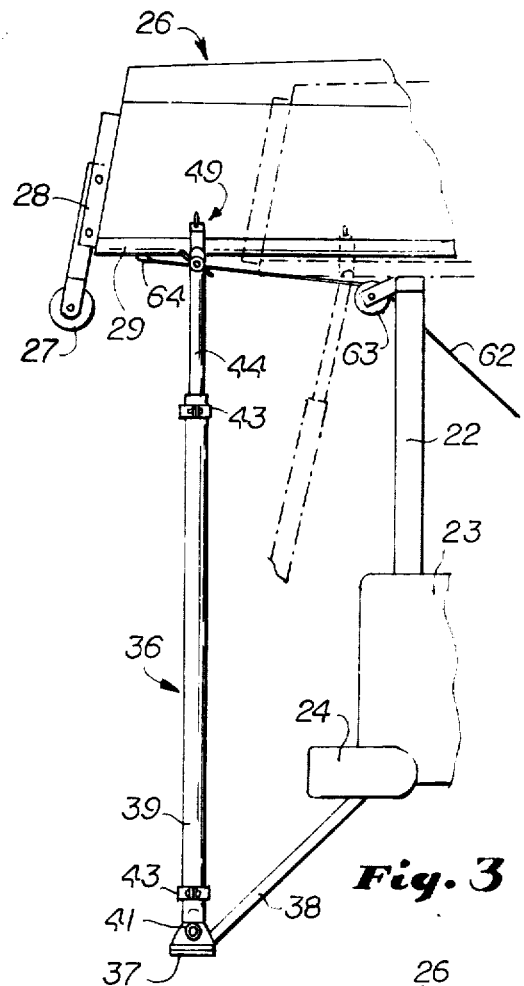
Fig. 3
Fig. 4
Fig. 5
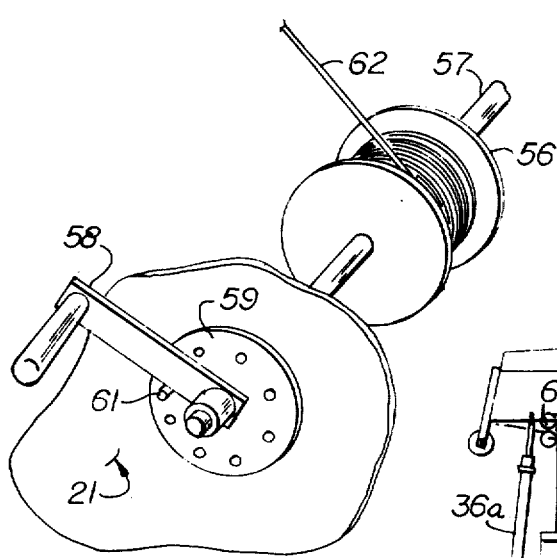
Fig. 6
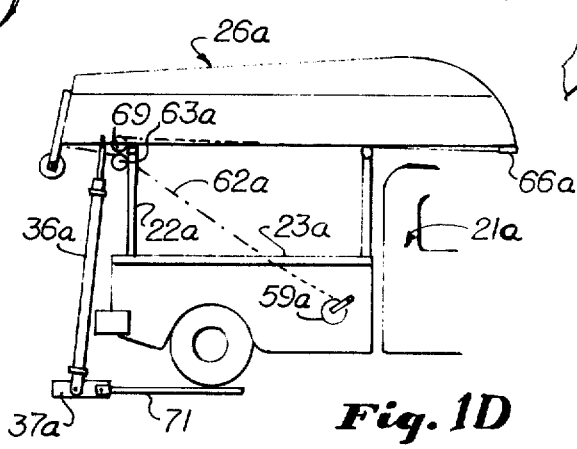
Fig. 1D

LOADING HOIST FOR BOATS

This invention relates to a new and improved loading hoist for boats but may be used to hoist other objects from the ground or water on to the top of a pick-up truck loading rack, a camper, the roof of a station wagon or other vehicle.

One of the features of the invention is the fact that the hoist is operated merely by turning a crank to either load or unload the board from the vehicle.

Another feature of the invention is the fact that the hoist is adaptable to a wide variety of boats and also to a wide variety of vehicles differing in height from the ground and other dimensions.

Further features of the invention are the fact that it is light in weight, easily assembled and disassembled for storage and inexpensive.

Further features of the invention are the rapidity with which it may be installed and disassembled and the rapidity with which the boat may be loaded and unloaded.

Another feature of the invention is the fact that the use of the hoist is safe for the user and unlikely to damage the boat since the operation is smooth and no balance points are involved when the boat must be left unattended while the user shifts any part of the mechanism. Further, the device does not permit the boat to tip sidewardly and/or to fall either in loading or unloading.

Other objects of the present invention will become apparent upon reading the following specification and referring to the accompanying drawings in which similar characters of reference represent corresponding parts in each of the several views.

In the drawings:

FIG. 1D is a view similar to FIG. 1 showing a modification in the attachment of the hoist to the vehicle and further showing use of the hoist to unload the boat.

FIG. 2 is an enlarged rear elevational view of the hoist in the position of FIG. 1C.

FIG. 3 is a side elevational view of the structure of FIG. 2.

FIG. 4 is a further enlarged side elevational view of the prow of the boat showing the rope guide.

FIG. 5 is a bottom elevation of the structure of FIG. 4.

FIG. 6 is a perspective view broken away to reveal internal construction showing the winch.

Figure 1:
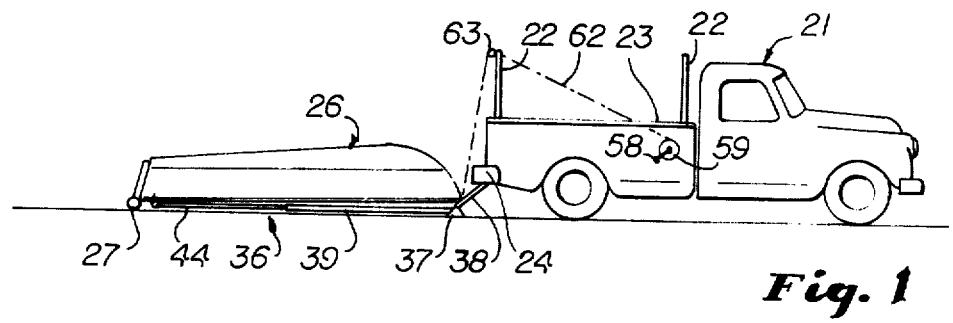
FIG. 1 is a schematic side elevational view showing the hoist in initial position for lifting a boat on to a pick-up truck.

This invention relates to a new and improved loading hoist for boats. In a preferred embodiment of the invention, the hoist is attached to truck 21 of the pickup type having inverted U-shaped supports 22 extending up from the bed 23 as is quite common in pick-up trucks used for carrying long objects such as ladders which extend forward over the cab. The hoist is preferably connected to the rear of the truck 21 as by clamping to the rear bumper 24. A typical boat 26 used with the hoist is provided with stern wheels 27 connected to the stern by adjustable supports 28. In order to attach the hoist, there must be a suitable connecting means such as gunwales 29. As is best shown in FIG. 1, at the commencement of the hoisting operation, boat 26 is turned upside down with its prow immediately behind the rear bumper 24.

Hoist 36 is simple and inexpensive. On either side is a foot 37 which rests on the ground below and to the rear of the bumper 24 and braced thereto by braces 38 clamped to the bumper or other convenient portion of the truck. Lower telescopic sleeve member 39 is pivotally connected to foot 37 by pivot 41. The lower telescopic members 39 on each side are cross-braced to each other by cross braces 42 which are attached by means of attachments 43. Slidable in the upper end of each member 39 is an upper telescopic member 44. Interconnecting the upper ends of members 44 is a cross rod 46 which may be bent or otherwise fabricated to clear the structure of the boat. The outer threaded ends of rod 46 are connected to the upper ends of members 44 by nuts 47.

Rod 46 is clamped to each gunwale 29 by means of a clamp 49. A preferred clamp consists of a sleeve 51 which slides on rod 46 so as to accommodate boats of different widths. Associated with sleeve 51 is a hook 52 which hooks around gunwale 29 and is tightened by means of stud 53 which is fixed to sleeve 51. By turning nut 54, the hook 52 may be clamped to gunwale 29.

To lift the boat, a winch 56 is located on a portion of the vehicle such as the bed 23. Winch 56 has a shaft 57 having a handle 58 at one end for turning the winch. An apertured disc 59 is fixed adjacent to handle 58 and a pin 61 may be placed in one of the holes in disc 59 to prevent the winch from unwinding. The winch rope 62 extends from winch 56 rearward and upward over pulley 63 which may be bracketed to the rear support 22, thence down to the ground and through an inverted channel-shaped guide 66 on the prow of boat 26 and thence under the boat to a point of attachment 64 adjacent the stern.

Figure 1A:
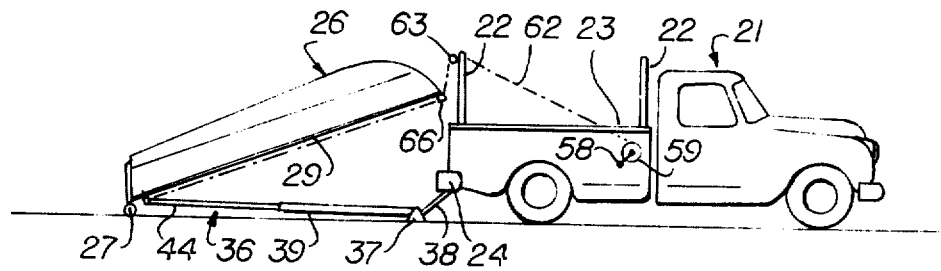
FIGS. 1A, 1B and 1C are views similar to FIG. 1 showing different stages in the sequence of lifting the boat.
Figure 1B:
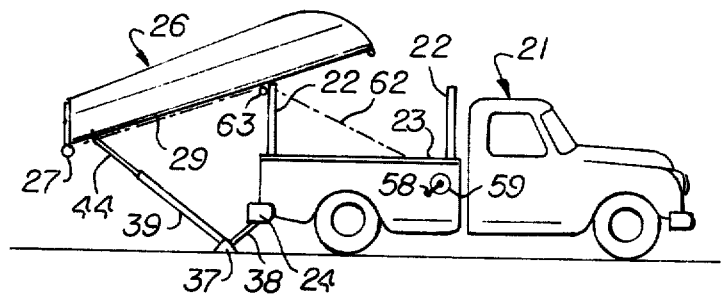
Figure 1C:
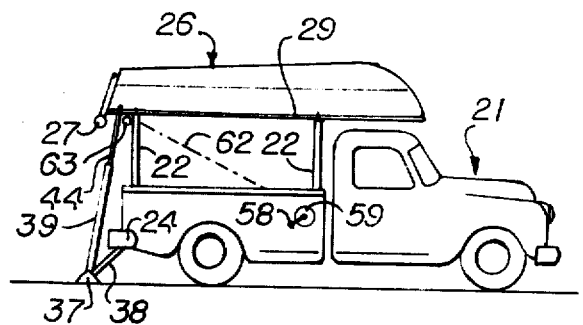

Directing attention to FIG. 1, the boat 26 is installed on the hoist 36 as the latter rests on the ground in extended position. The boat is inverted with the prow extending forward. Winch rope 62 extends under the guide 66, under the boat and is attached to attachment 64 at the stern. As the winch handle 58 is turned, rope 61 tightens and lifts the prow upward to the position of FIG. 1A particularly in that the rope 62 fits through guide 66. During this movement, the boat 26 slides forward on wheels 27 and the upper members 44 telescope slightly inwardly relative to the lower members 39. The prow clears the rear support 22 and the stern is lifted off the ground, the weight of the boat being borne in FIG. 1B by the rear support 22 and the rope 62 while the hoist serves as a guide. The final position of rest is shown in FIG. 1C with the boat resting on both supports 22. After having been suitably tied down, the hoist may be removed and replaced when it is necessary to lower the boat to the ground.

FIG. 1D shows unloading the boat 26a from the vehicle 21a. In this operation, the rope 62a passes under pulley 63a and thence forwardly under the boat 26a to a point of attachment at or adjacent guide 66a. By winding winch 59a, the boat 26a is pulled rearwardly. Preferably, pulley 63a has incorporated in it a secondary pulley 69 so that when the boat 26a is being lowered to the ground pulley 69 functions to prevent a rapid drop. In other respects, the structure of FIG. 1D is similar to that of the preceding modification and the same reference numerals followed by subscript *a* are added to designate corresponding parts.

FIG. 1D also illustrates a modification in the means of attachment of the hoist 36a to the vehicle 21a, eliminating the braces 38 of the preceding modification. A pair of forwardly extending treads 71 are pivoted to feet 37a and extend under the rear tires of vehicle 21a. The weight of the vehicle anchors the hoist 36a during either unloading (which is illustrated in FIG. 1D) or during loading wherein the operations are the same as illustrated in FIGS. 1–1C inclusive.

What is claimed is:

1. A hoist for raising a boat from the ground to the top of a vehicle comprising a hoist frame, said hoist frame comprising on each side of said frame a foot resting on the ground, means for securing said feet to a vehicle, a pair of lower telescopic members, means pivotally connecting the lower end of said lower telescopic members to said feet about a transverse horizontal pivot, bracing means to hold said lower telescopic members parallel to each other, an upper telescopic member slidable in the upper end of each of said lower telescopic members, and clamp means on the upper end of each of said upper telescopic members to clamp said hoist frame to the gunwale of a boat; and lifting means for hoisting a boat fixed to said hoist frame with said hoist frame initially extended and resting on the ground and the boat inverted and overlying said hoist frame with said clamp means secured to opposite sides adjacent the stern of the boat, said lifting means including a rope, a pulley-like member at the rear of the top of the vehicle over which said rope runs and thence down to the ground, under the prow of the boat and said rope is attached to said boat at its stern.

2. A hoist according to claim 1 in which said lifting means further comprises a winch for said rope mounted on said vehicle.

3. A hoist according to claim 1 which further comprises a rod connecting the upper ends of said upper telescopic members, said clamp means being slidable on said rod to accommodate boats of different widths.

4. A hoist according to claim 3 in which said clamp means comprises a slide, an arm pivoted to said slide and means for tightening one end of said arm against the gunwale of said boat.

5. A hoist according to claim 1 which further comprises an open top channel-shape guide on the prow of said boat, said rope initially extending under said guide prior to lifting said boat.

* * * * *